United States Patent [19]
Beck et al.

[11] Patent Number: 5,199,769
[45] Date of Patent: Apr. 6, 1993

[54] VALVE, IN PARTICULAR FOR SLIP-CONTROLLED HYDRAULIC BRAKE SYSTEMS

[75] Inventors: Erhard Beck, Weilburg; Bernd Schweighofer, Schmitten; Horst Kornemann, Frankfurt am Main, all of Fed. Rep. of Germany

[73] Assignee: Alfred Teves GmbH, Frankfurt am Main, Fed. Rep. of Germany

[21] Appl. No.: 688,949

[22] PCT Filed: Sep. 8, 1990

[86] PCT No.: PCT/EP90/01520
§ 371 Date: May 14, 1991
§ 102(e) Date: May 14, 1991

[87] PCT Pub. No.: WO91/04181
PCT Pub. Date: Apr. 4, 1991

[30] Foreign Application Priority Data
Sep. 14, 1989 [DE] Fed. Rep. of Germany ....... 3930757

[51] Int. Cl.$^5$ .............................................. F16K 17/06
[52] U.S. Cl. .................................. 303/114.1; 137/514; 303/84.1
[58] Field of Search ......... 303/113 R, 114 R, DIG. 4, 303/DIG. 5, DIG. 6, DIG. 1, DIG. 2, DIG. 3, 84.1; 137/514, 514.3, 514.5, 514.7, 517, 540, 541

[56] References Cited
U.S. PATENT DOCUMENTS

| | | | |
|---|---|---|---|
| 2,345,379 | 3/1944 | Campbell | 137/514.5 |
| 3,003,423 | 10/1961 | Drutchas | 137/514 |
| 3,354,898 | 11/1967 | Barnes | 137/514 |
| 3,782,412 | 1/1974 | Darash | 137/514 |
| 4,030,520 | 6/1977 | Sands | 137/514 |
| 4,440,454 | 4/1984 | Belart et al. | 303/114 R |

FOREIGN PATENT DOCUMENTS

| | | |
|---|---|---|
| 1675425 | 12/1970 | Fed. Rep. of Germany . |
| 2114508 | 10/1971 | Fed. Rep. of Germany . |
| 3713661 | 11/1988 | Fed. Rep. of Germany . |
| 8604657 | 8/1986 | World Int. Prop. O. ....... 137/514.5 |

Primary Examiner—Matthew C. Graham
Attorney, Agent, or Firm—Robert P. Seitter; J. Gordon Lewis

[57] ABSTRACT

A valve, is disclosed having a valve seat (2) receiving a valve tappet (1), the valve tappet (1) being axially movably guided in a valve housing (10), as well as comprising a flow in (3) controllable between the valve tappet (1) and the valve seat (2) and being in communication with the pressure-fluid channels (11) in the valve housing (10). In order to minimize the valve's operation noise, the present invention arranges to radially load the valve tappet (1) relative to the valve seat (2) under the action of a transverse force F, an asymmetric flow space prevailing in the flow path (3).

4 Claims, 1 Drawing Sheet

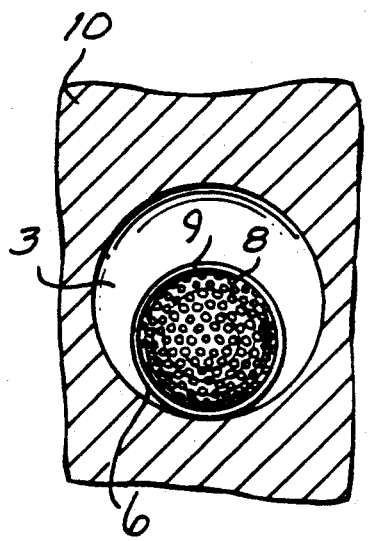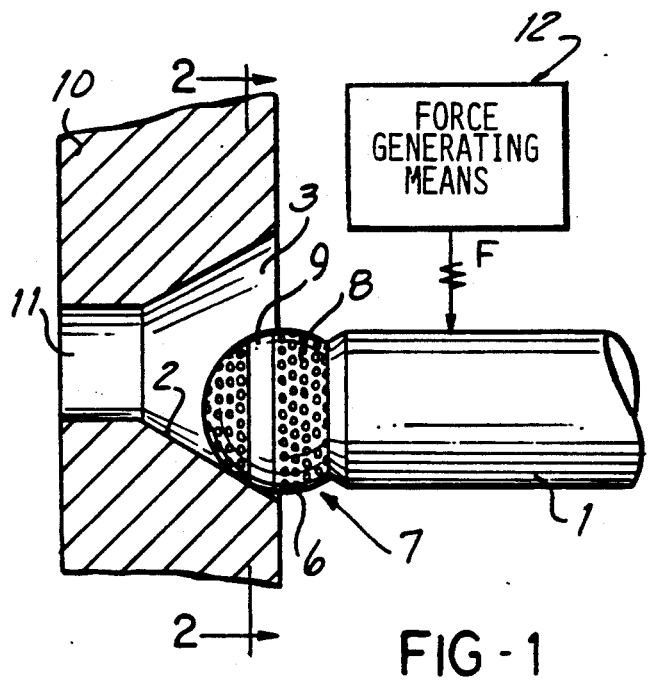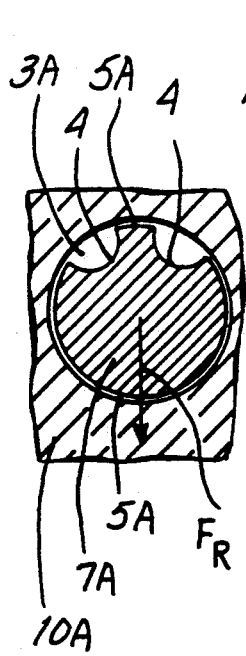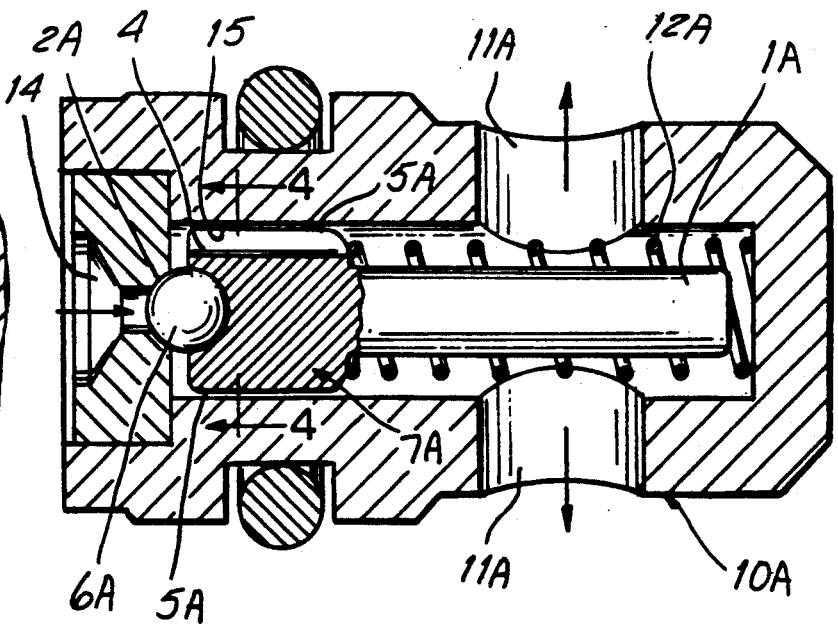

VALVE, IN PARTICULAR FOR SLIP-CONTROLLED HYDRAULIC BRAKE SYSTEMS

INTRODUCTION

The present invention is related to flow control valves, and more particularly, noise reduction in the operation of valves of the type in which a valve tappet is mounted in a bore in a valve housing, the valve tappet moving towards and away from a valve seat during operation.

BACKGROUND OF THE INVENTION

Such valves are commonly used in slip-controlled hydraulic brake systems.

Valves for a slip-controlled hydraulic brake system are disclosed in German patent application P 37 01 019.0, each comprising a valve seat receiving a valve tappet, the valve tappet being moved by an electromagnet and being axially movably guided in a valve housing. An annular flow cross-section opens between the valve tappet and the valve seat when the valve tappet is shifted in a controllable manner, the flow cross-section communicating with pressure-fluid channels within the valve housing. To control all brake circuits, several valves are often included in a common valve block housing so that there is accomplished a space-saving positioning of each valve in an economical and cost-efficient manner.

What is to be considered less favorable in the known valve design is the noise behavior of the valve during the valve's shift periods, which behavior is due to the marginal layer separation of on the valve closure member circulated by hydraulic fluid as well as due to the resultant radial vibrations and/or the radial contact of the valve tappet on the valve seat in consequence of unstable flow.

In order to diminish the occurrence of noise and thus the transmission of sound conducted through the housing major passive and also active measures for noise attenuation are taken at present which, however, all entail considerable cost and offer more or less satisfying results.

SUMMARY OF THE INVENTION

It is, therefore, an object of the present invention to improve a valve of the type referred to to achieve a significant noise reduction during the valve's shift periods to overcome the drawbacks of prior design, while the operational reliability is ensured at the same time.

This object is achieved by causing a force to be generated which acts on the tappet causing one side of a tappet head to be urged into contact an adjacent surface housing, with asymmetric flow opening defined at the other side of the tappet head receiving flow through the valve.

A valve is obtained thereby which considerably diminishes the cause of noise without increasing manufacturing costs excessively and without significantly impairing the control function of the valve.

In a preferred embodiment of the subject matter of this invention, a transverse force resultant is exerted on the valve tappet by virtue of the available pneumatic or hydraulic flow media, caused by an asymmetric pressure distribution in the flow cross-section. A radial shift of the valve closure member thereafter results in a concentric configuration of the penetration surface.

An alternative embodiment of this invention for generating the transverse force resultant is obtained by a mechanical transverse spring action in that the radial abutment of the valve tappet on the valve seat is rendered possible by inserting an inclined washer in the area of the valve tappet guidance, for instance.

Low cost manufacture of the valve tappet in the area of the tappet head results from the asymmetric arrangement of the axially extending recesses which determine the penetration surface, since for example instead of the symmetric distribution of four groove-shaped recesses over the circumference, only two recesses of greater width are provided on a portion of the tappet head. This facilitates the manufacturing process.

Owing to a fluted shape of the grooves in the tappet head, a valve tappet minimized in respect of inherent stress as well as optimized in respect to flow is attained which adopts an eccentric position under the action of radial pressure forces.

In order to insure leak free sealing of the valve closure member of the valve seat, one embodiment of the invention provides that the valve closure member comprise a spherical valve.

The configuration of the surface of the ball influences the flow behavior to shift over from laminar to turbulent flow so that, for the purpose of a turbulent form of the marginal layer, there remains a rapid change-over of flow and hence only a short laminar flow route at the valve closure member circulated by fluid.

Owing to rapidly passing the flow over into the turbulence range, for example by way of a dimple pattern establishing an interference field on the surface of the valve closure member, there is accomplished in an advantageous manner displacement of the point of shift far downstream of the closure member.

With a view to attaining an optimal sealing effect in this embodiment, the valve closure member is formed with smooth narrow band constituting a small ring seal zone of high surface precision so that there is insured a leak free valve-seat contact largely independent of fit tolerances and positional tolerances.

BRIEF DESCRIPTION OF THE DRAWINGS

In the drawing,

FIG. 1 is a partial view of a first embodiment of the valve component parts relevant for the invention, illustrated in longitudinal cross-section;

FIG. 2 is a cross-section taken along the line 2—2 of the valve according to FIG. 1;

FIG. 3 is a total view with longitudinal cross-section of a second embodiment; and FIG. 4 is a cross-section taken along the line 4—4 of the valve according to FIG. 3.

DETAILED DESCRIPTION

FIG. 1 depicts an embodiment of a valve tappet 1, having a valve closure member 6 configured as a spherical seat valve formed on a tappet head. The valve closure member corresponds by sections with a frusto-conical valve seat 2 formed in a valve housing 10. On its surface, the spherical seat valve 6 is formed with a pattern of dimples 8 for producing an interference field that promotes the change-over of the marginal layer from laminar to turbulent flow. Extending through this interference field is a smooth band 9 defined by a narrow annular zone of high surface precision which forms the sealing seat and which is on all sides in contact with the conical valve seat 2 in the valve's closed position.

In the valve's position illustrated in the drawing, the valve tappet 1 is compliantly axially offset under the action of a transverse force F generated by a symbolically shown spring 12, so that the flow cross-section 3 is asymmetric to the valve seat 2. The radial offsetting of the valve tappet 1 can be realized easily by specific mechanical transverse force generating means action, in particular by chamfered washers and/or wedges in the area of the valve tappet guidance so that the valve tappet 1, in the opened condition, touches the valve seat 2 on a small surface and thus in this way is supported on one side. Due to the eccentric alignment of the valve tappet 1, there is produced an asymmetric gap 3 for accommodating fluid flow, increasing the volume of fluid flow to the flow passage 11 as well as a support of the valve tappet 1 on the valve seat 2. Since the valve tappet is supported, it is almost free from radial vibrations and consequently causes little sound conducted through solids.

Conventional valves achieve flow rates at the narrowest symmetric flow cross-section laminar Reymonds number such that the marginal layer separation commences quite early, yet at the latest in the range of the pressure minimum and thus shortly after the range of the smallest flow cross-section. Consequently, adjustment of an eccentric gap flow aperture not only allows lessening of the influence of the friction layers close to the wall, but also allows displacement of the area of separation farther downstream, while the volume of fluid flow is increased at the same time. A remarkable noise reduction is attainable in particular in the event of early change-over of the flow field from laminar to turbulent, assisted by defined interference features on the surface contour of the closure member 6 encountered by the fluid flow.

FIG. 2 shows the line of intersection 2—2 of the valve tappet 1 described in FIG. 1 in its opened condition so that, due to the transverse shift of the tappet 1 which is caused mechanically, preferably by way of wedges, an eccentric flow cross-section 3 is created which permits a flow sheet that is minimized in terms of friction and separation as well as a simultaneous increase in the volume of fluid flow. The radial vibrations producing the sound conducted through solids are prevented by the transverse stabilization of the valve tappet 1 occurring due to the one-side small-surface tappet support on the valve seat 2.

FIG. 3 shows an alternative embodiment of a valve, acting as a pressure relief valve, in which a valve tappet 1A is guided in a valve housing 10A in an axially offsettable manner. The valve tappet 1A is formed at one end with a tappet head 7. Guiding surfaces 5 are arranged asymmetrically around the circumference of the tappet head 7, guiding movement of the tappet head 7A in a bore 15 of the housing 10A. These guiding surfaces 5A are interrupted by fluted grooves 4, thereby permitting the fluid to enter into the adjacent outlet flow passages 11A when the flow gap 3A is opened.

On the stem end remote from a valve closure ball member 6A, the valve tappet 1A is provided with a valve spring 12 whose biasing force corresponds to the excess pressure to be governed. Upon attainment of a predetermined control pressure, the valve closure ball member 6A, normally seated on a spherical valve seat 2A will more off the valve seat and 2A open a flow path from an inlet passage 14 so that pressure fluid can discharge from the operating system through outlet passages 11A.

In contrast to the valve tappet 1A with the transverse shift effect, the conventional valve tappet is subject to radial vibrations during the periods of valve opening so that noise is caused by the pulse-like radial contacting of the guiding surfaces on the valve housing wall, which noise is objectionable.

In this regard, FIG. 4, shows the cross-section 4—4 of the inventive further development of the tappet head 7, on the circumference of which grooves 4 are distributed asymmetrically instead of symmetrically. After opening of the flow gap 3A between the valve closure member 6A and the valve seat 2A, the pressure fluid can flow via the two grooves 4 according to the drawing, whereby due to the asymmetric pressurization of the tappet head 7 by the much greater surface area created by the grooves 4, a resultant force FR directed away from the grooves 4 ensures an eccentric alignment of the tappet head 7A on the guiding surface 5A opposite to the grooves 4 relative to the valve housing 10. Thus, a solution to the noise problem is found, compatible with the valve function, which solution precludes radial vibrations by using simple means.

We claim:

1. A valve for controlling flow comprising a housing, an inlet passage and an outlet passage, a valve tappet, mounted in said valve housing for axial opening and closing movement, a tappet head formed on said valve tappet, a valve seat defining in part a flow path from said inlet passage to said outlet passage, a bore in said housing slidably receiving said valve tappet head, to axially movably guide said valve tappet head, a valve closure member moved by said valve tappet head onto said valve seat by closing movement of said valve tappet, said valve tappet head interposed between said valve seat and said outlet passage, at least one groove recessed into the circumferential outer surface of one side of said valve tappet head and extending longitudinally along the length thereof to accommodate fluid flow from said valve seat to said outlet passage when said valve closure member is moved off said valve seat by opening movement of said valve tappet, said groove creating a substantially greater circumferential area on said one side of said valve tappet head to generate a transverse force by the pressure of fluid flowing past said valve tappet head and acting on said circumferential area thereof, said groove comprising a asymmetric flow passage past said valve tappet head.

2. A valve as claimed in claim 1, wherein said at least one groove includes a plurality of fluted grooves extending in an axial direction are recessed into said circumferential surface of said one side of said valve tappet head.

3. A valve according to claim 2, wherein said valve tappet head is cylindrical in cross section and two of said fluted grooves are provided side by side spaced apart on said one side thereof, said bore in said housing also cylindrically shaped to guide said valve tappet head on guide surfaces constituted by surfaces intermediate said two fluted grooves.

4. A valve according to claim 2, wherein said valve closure element comprises a ball mounted on said one end of said valve tappet head.

* * * * *